(12) United States Patent
Cho et al.

(10) Patent No.: US 10,962,412 B2
(45) Date of Patent: *Mar. 30, 2021

(54) LIGHT FILTER AND SPECTROMETER INCLUDING THE LIGHT FILTER

(71) Applicant: SAMSUNG ELECTRONICS CO., LTD., Suwon-si (KR)

(72) Inventors: Kyungsang Cho, Gwacheon-si (KR); Chanwook Baik, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/781,664

(22) Filed: Feb. 4, 2020

(65) Prior Publication Data
US 2020/0173850 A1 Jun. 4, 2020

Related U.S. Application Data

(63) Continuation of application No. 15/916,914, filed on Mar. 9, 2018, now Pat. No. 10,571,332.

(30) Foreign Application Priority Data

Aug. 8, 2017 (KR) .................. 10-2017-0100444
Oct. 24, 2017 (KR) .................. 10-2017-0138457

(51) Int. Cl.
*G01J 3/02* (2006.01)
*G01J 3/28* (2006.01)
(Continued)

(52) U.S. Cl.
CPC ........... *G01J 3/0229* (2013.01); *G01J 3/0256* (2013.01); *G01J 3/2803* (2013.01); *G01J 3/2823* (2013.01); *G02B 5/201* (2013.01); *G01J 2003/1213* (2013.01); *G01J 2003/2806* (2013.01); *G01J 2003/2813* (2013.01)

(58) Field of Classification Search
CPC ...... G01J 3/0229; G01J 3/0256; G01J 3/2823; G01J 3/2803; G01J 2003/2813; G01J 2003/1213; G01J 2003/2806; G01J 3/28; G02B 5/201; G01N 21/255
See application file for complete search history.

(56) References Cited

U.S. PATENT DOCUMENTS 5,726,805 A 3/1998 Kaushik et al.
8,045,157 B2 10/2011 Shibayama et al.
(Continued)

FOREIGN PATENT DOCUMENTS

EP 3 144 980 A1 3/2017
WO 2013126548 A2 8/2013

OTHER PUBLICATIONS

Chang, C., & Lee, Fl., "On the estimation of target spectrum for filter-array based spectrometers", Optics Express, vol. 16, No. 2, pp. 1056-1061 (Jan. 21, 2008).
(Continued)

*Primary Examiner* — Abdullahi Nur
(74) *Attorney, Agent, or Firm* — Sughrue Mion, PLLC

(57) ABSTRACT

A light filter includes a plurality of spectrum modulation portions, each having a different thicknesses or a different mixing ratio of materials thereof. Each of the plurality of spectrum modulation portions has a different transmittance spectrum.

15 Claims, 21 Drawing Sheets

(51) Int. Cl.
*G02B 5/20* (2006.01)
*G01J 3/12* (2006.01)

(56) References Cited

U.S. PATENT DOCUMENTS

| | | |
|---|---|---|
| 8,134,141 B2 | 3/2012 | Krishna et al. |
| 8,854,624 B2 | 10/2014 | Pervez et al. |
| 9,103,986 B2 | 8/2015 | Margalit |
| 9,574,942 B2 | 2/2017 | Goldring et al. |
| 10,571,332 B2 * | 2/2020 | Cho .................. G02B 5/201 |
| 2007/0091272 A1 | 4/2007 | Lerner |
| 2007/0262294 A1 | 11/2007 | Peterson et al. |
| 2010/0245975 A1 | 9/2010 | Cummings |
| 2012/0038789 A1 | 2/2012 | Kelly |
| 2014/0061486 A1 | 3/2014 | Bao et al. |
| 2014/0093979 A1 | 4/2014 | Papazoglou et al. |

OTHER PUBLICATIONS

Shao-Wei Wang et al., "Concept of a high-resolution miniature spectrometer using an integrated filter array", Optics Letters, vol. 32, No. 6, pp. 632-634 (Mar. 15, 2007).
Bao, J. & Bawendi, M. G. "A colloidal quantum dot spectrometer", Nature, vol. 523, 16 total pages (Jul. 2, 2015).
Communication dated Oct. 9, 2018 issued by the European Patent Office in European Counterpart Application No. 18165710.7.

* cited by examiner

LIGHT FILTER AND SPECTROMETER INCLUDING THE LIGHT FILTER

CROSS-REFERENCE TO RELATED APPLICATIONS

This application is a continuation application of U.S. application Ser. No. 15/916,914 filed Mar. 9, 2018, which claims priority from Korean Patent Application Nos. 10-2017-0100444, filed on Aug. 8, 2017 and 10-2017-0138457, filed on Oct. 24, 2017, in the Korean Intellectual Property Office, the disclosures of which are incorporated herein in their entireties by reference.

BACKGROUND

1. Field

Apparatuses consistent with exemplary embodiments relate to light filters and spectrometers including the light filters.

2. Description of the Related Art

Due to its compact size, a small spectrometer may be easily carried around and broadly applied to any of various devices, e.g., biosensors and portable gas sensors. However, it is quite difficult to use a spectroscopic method based on a grating structure in the case of a small-sized spectrometer.

SUMMARY

One or more exemplary embodiments may provide light filters and spectrometers including the light filters.

Additional exemplary aspects will be set forth in part in the description which follows and, in part, will be apparent from the description, or may be learned by practice of the presented exemplary embodiments.

According to an aspect of an exemplary embodiment, a light filter includes a plurality of spectrum modulation portions having different thicknesses or different mixing ratios of materials thereof, and having different transmittance spectra.

The plurality of spectrum modulation portions may be arranged in an array form.

The transmittance spectra of the plurality of spectrum modulation portions may have a non-linear relationship.

The transmittance spectra of the plurality of spectrum modulation portions may not be parallel to one another. The transmittance spectra of the plurality of spectrum modulation portions may not intersect one another.

The spectrum modulation portions may each include at least one of quantum dots (QDs), an inorganic material, and a polymer.

The QDs may be of a single type, may have same size, and may include a same material.

The spectrum modulation portions may have different thicknesses. The spectrum modulation portions may have different mixing ratios of at least two of the QDs, the inorganic material, and the polymer.

The QDs may be of two or more types and may have at least one of different sizes and different materials.

The spectrum modulation portions may have different thicknesses. The spectrum modulation portions may have different mixing ratios of at least two of the QDs, the inorganic material, and the polymer. The spectrum modulation portions may have different mixing ratios of the QDs of the two or more types.

The spectrum modulation portions may have a thickness of about 10 nm to about 100 µm.

According to an aspect of another exemplary embodiment, a spectrometer includes a light filter including a plurality of partial filters, and a sensing unit configured to receive light transmitted through the light filter, wherein the plurality of partial filters include a plurality of spectrum modulation portions having different thicknesses or different mixing ratios of materials thereof, and having different transmittance spectra.

The plurality of spectrum modulation portions may be arranged in an array form.

The transmittance spectra of the plurality of spectrum modulation portions may have a non-linear relationship.

The transmittance spectra of the plurality of spectrum modulation portions may not be parallel to one another. The transmittance spectra of the plurality of spectrum modulation portions may not intersect one another.

The spectrum modulation portions may each include at least one of quantum dots (QDs), an inorganic material, and a polymer.

The QDs may be of a single type, may have a same size, and may include a same material.

The spectrum modulation portions may have different thicknesses. The spectrum modulation portions may have different mixing ratios of at least two of the QDs, the inorganic material, and the polymer.

The QDs may be of two or more types and may have at least one of different sizes and different materials.

The spectrum modulation portions may have different thicknesses. The spectrum modulation portions may have different mixing ratios of at least two of the QDs, the inorganic material, and the polymer. The spectrum modulation portions may have different mixing ratios of the QDs of the two or more types.

The sensing unit may include an image sensor or a photodiode.

The spectrometer may have a resolution equal to or lower than about 1 nm.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
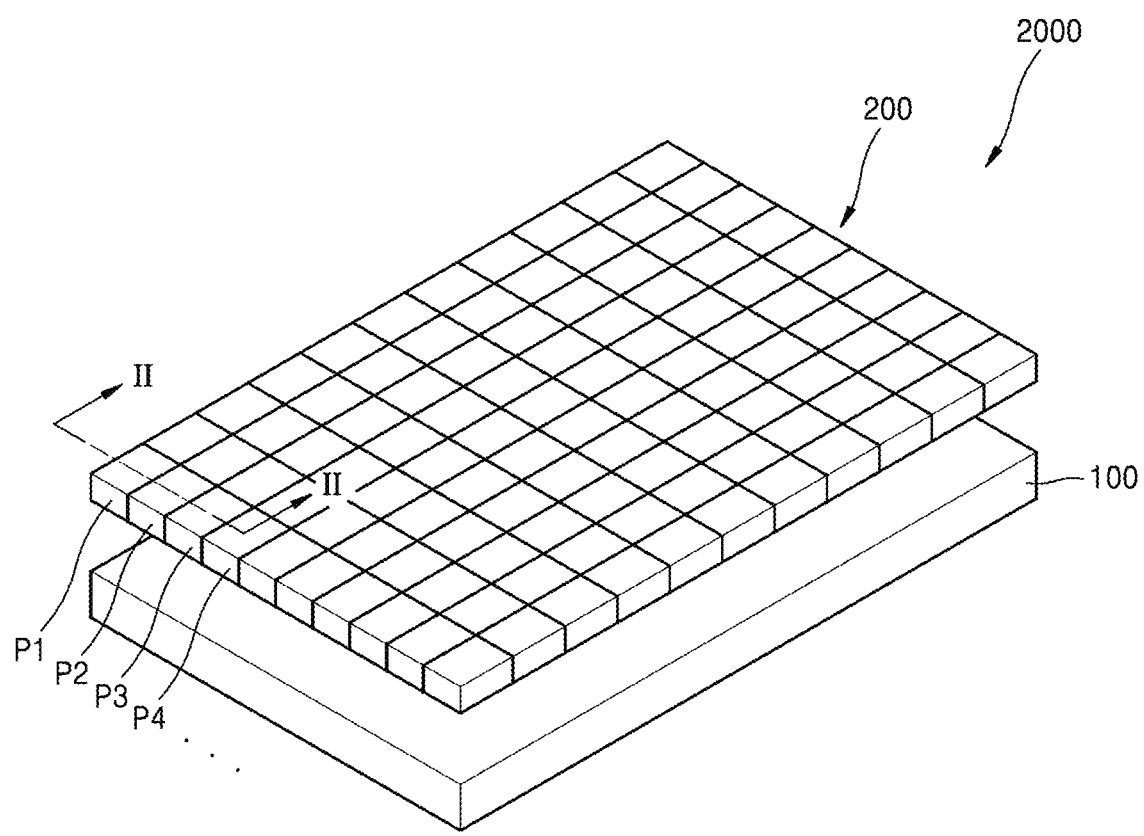
FIG. 1 is a perspective view of a spectrometer according to an exemplary embodiment.

Reference will now be made in detail to exemplary embodiments which are illustrated in the accompanying drawings, wherein like reference numerals refer to like elements throughout and the sizes or thicknesses of elements are exaggerated for clarity. It will be understood that when a layer is referred to as being "on" another layer or substrate, it can be directly on the other layer or substrate, or intervening layers may also be present. In the following descriptions, the material of each layer is provided as an example and thus other materials can also be used. Expressions such as "at least one of," when preceding a list of elements, modify the entire list of elements and do not modify the individual elements of the list.

FIG. 1 is a perspective view of a spectrometer 2000 according to an exemplary embodiment.

Referring to FIG. 1, the spectrometer 2000 includes a sensing unit 100 and a light filter 200 on the sensing unit 100. The light filter 200 may include a plurality of partial filters P1, P2, P3, P4, . . . arranged in a two-dimensional array. However, the two-dimensional array is merely an example and the partial filters P1, P2, P3, P4, . . . may be arranged in a one-dimensional array.

Figure 2:
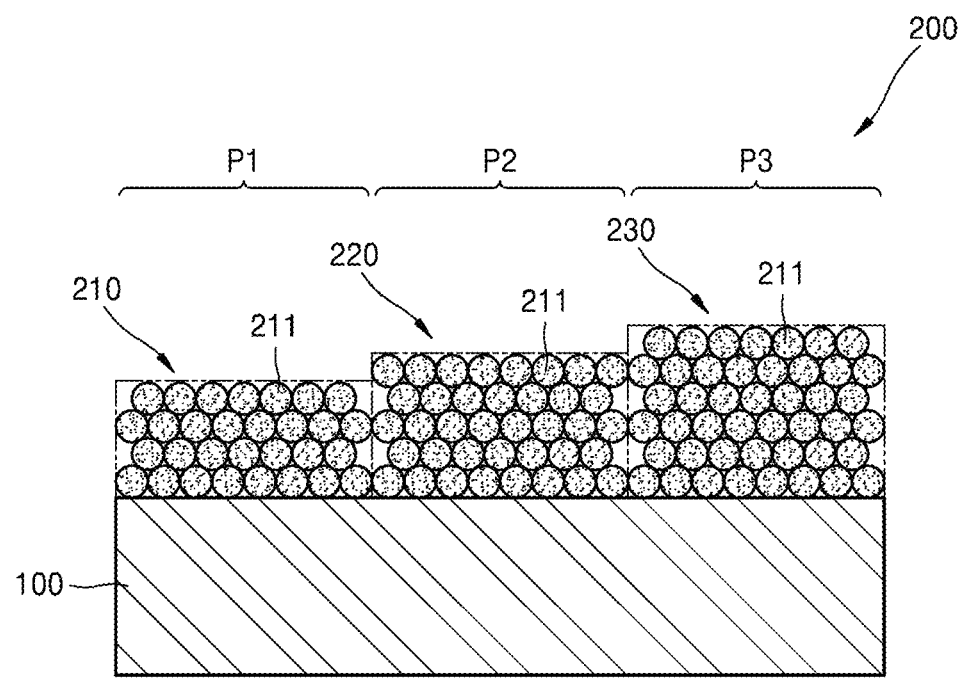
FIG. 2 is a cross-sectional view taken along a line II-II' of FIG. 1.

FIG. 2 is a cross-sectional view taken along a line II-II' of FIG. 1. FIG. 2 representatively shows only three partial filters of the light filter 200, e.g., the first, second, and third partial filters P1, P2, and P3.

Referring to FIG. 2, the first, second, and third partial filters P1, P2, and P3 include first, second, and third spectrum modulation portions 210, 220, and 230, respectively. The first, second, and third spectrum modulation portions 210, 220, and 230 may each include quantum dots (QDs) 211, e.g., colloidal QDs. The QDs 211 may include semiconductor particles, e.g., CdSe, CdS, PbSe, PbS, InAs, InP, or CdSeS particles, having a size of several nanometers. However, the above-mentioned materials are merely examples and the QDs 211 may include other various semiconductor materials. The first, second, and third spectrum modulation portions 210, 220, and 230 may be provided on a transparent substrate (not shown), e.g., a glass substrate.

The QDs 211 included in the first, second, and third spectrum modulation portions 210, 220, and 230 may be of a single type. Herein, the QDs of the single type refer to QDs having the same size and including the same material. Specifically, for example, the QDs 211 may include CdSe particles having a diameter of about 5 nm. However, the CdSe particles having a diameter of about 5 nm are merely an example.

In the current exemplary embodiment, to allow the partial filters P1, P2, P3, P4, . . . to generate different transmittance spectra, the first, second, and third spectrum modulation portions 210, 220, and 230 may have different thicknesses. Specifically, for example, the first, second, and third spectrum modulation portions 210, 220, and 230 may include CdSe particles having a diameter of about 5 nm, and may have thicknesses of about 10 nm, about 40 nm, and about 70 nm, respectively. However, the CdSe particles having a diameter of about 5 nm and the thicknesses of about 10 nm, about 40 nm, and about 70 nm are merely an example and the current embodiment is not limited thereto. The first, second, and third spectrum modulation portions 210, 220, and 230 may have a thickness of about 10 nm to about 100 μm.

The sensing unit 100 may receive light transmitted through the light filter 200 and convert the received light into an electrical signal. Light incident on the light filter 200 is transmitted through the partial filters P1, P2, P3, P4, . . . and reaches pixels (not shown) of the sensing unit 100. The light incident on the pixels of the sensing unit 100 is converted into an electrical signal. The sensing unit 100 may include, for example, an image sensor such as a charge coupled device (CCD) or a complementary metal-oxide semiconductor (CMOS) image sensor, or a photodiode.

The spectrum of light incident on the spectrometer 2000 may be reconstructed using the transmittance spectra of the partial filters P1, P2, P3, P4, . . . and signals of the sensing unit 100.

Specifically, the relationship between the transmittance spectra of the partial filters P1, P2, P3, P4, . . . and the signals of the sensing unit 100 may be defined by Equation 1:

$$r = Hs + n, \quad (1)$$

where r denotes the signals of the sensing unit 100; H denotes a transmittance spectrum matrix of the partial filters P1, P2, P3, P4, . . . ; s denotes an input spectrum (e.g., a reconstructed input spectrum); and n denotes noise. These variables may be defined in a matrix form as shown below. Herein, the transmittance spectrum matrix H shows transmittances based on wavelengths in the transmittance spectra of the partial filters P1, P2, P3, P4, . . . in a matrix form, and includes values measured in a test. The transmittance spectrum matrix H may be calculated using known values of the input spectrum s based on wavelengths and the measured signals r:

$$r = \begin{bmatrix} r_1 \\ \vdots \\ r_j \\ \vdots \\ r_N \end{bmatrix}, H = \begin{bmatrix} D_1(\lambda_1) & \cdots & D_1(\lambda_M) \\ \vdots & \vdots & \vdots \\ D_j(\lambda_1) & \cdots & D_j(\lambda_M) \\ \vdots & \vdots & \vdots \\ D_N(\lambda_1) & \cdots & D_N(\lambda_M) \end{bmatrix}, s = \begin{bmatrix} s(\lambda_1) \\ s(\lambda_2) \\ \vdots \\ s(\lambda_M) \end{bmatrix}, \text{ and}$$

$$n = \begin{bmatrix} n_1 \\ n_2 \\ \vdots \\ \vdots \\ n_N \end{bmatrix}.$$

(where λ denotes a wavelength, N denotes the number of partial filters, and M denotes the number of signals.)

When a parameter of the transmittance spectrum matrix H is determined in an initial test, the input spectrum s may be calculated using an inverse matrix of the transmittance spectrum matrix H of the light filter 200 and the signals r of the sensing unit 100. The value of the noise n may refer to dark noise caused in the sensing unit 100, and is a small value that is normally ignorable. To increase the accuracy of calculation, if necessary, a dark noise value measured in a darkroom environment may be used.

In the current exemplary embodiment, different transmittance spectra of the partial filters P1, P2, P3, P4, . . . may be generated when the first, second, and third spectrum modulation portions 210, 220, and 230 including the QDs 211 of the single type have different thicknesses, and an input spectrum may be calculated using the transmittance spectra of the partial filters P1, P2, P3, P4, . . . .

Figure 13A:
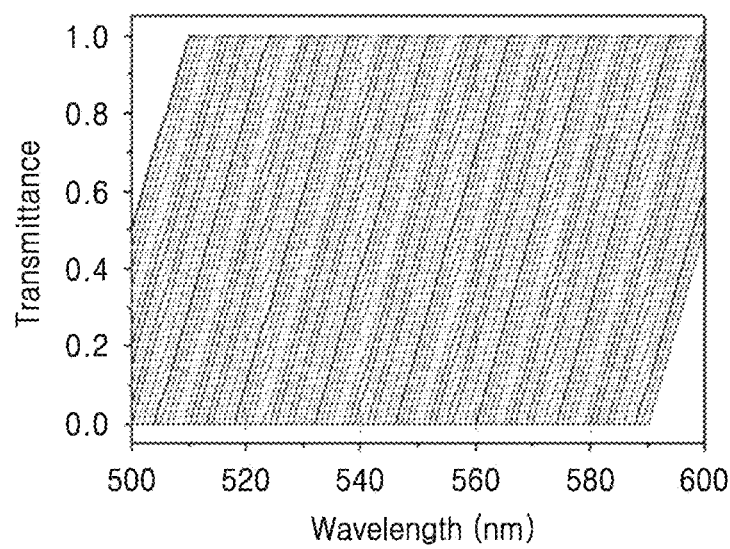
FIGS. 13A and 13B are graphs showing examples of inappropriate transmittance spectra of partial filters, according to an exemplary embodiment.
Figure 13B:
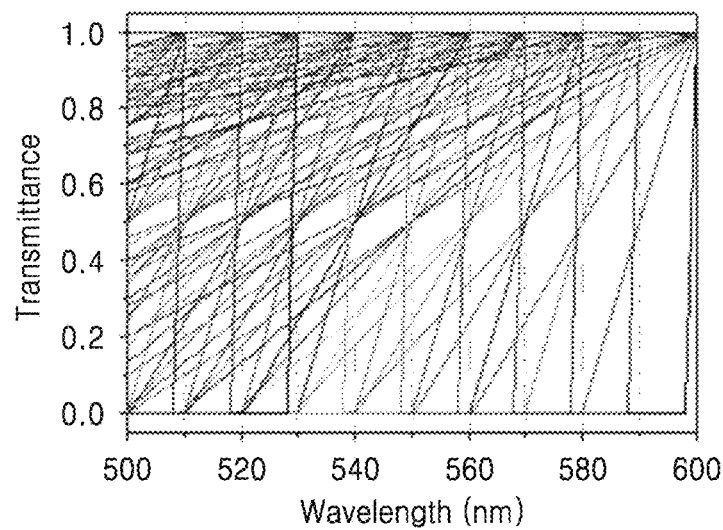

The different transmittance spectra of the partial filters P1, P2, P3, P4, . . . may increase the accuracy of the calculated input spectrum. For example, the different transmittance spectra may have a non-linear relationship. In contrast, transmittance spectra, which are parallel to one another (as shown in FIG. 13A) or intersect one another (as shown in FIG. 13B), can cause errors during calculation or reduce accuracy of the calculated input spectrum, and thus is not desired.

As described above, the partial filters P1, P2, P3, P4, . . . may generate different transmittance spectra when the first, second, and third spectrum modulation portions 210, 220, and 230, including the QDs 211 of the single type, have different thicknesses. For example, if 100 or more different transmittance spectra are generated as described above within a wavelength range of about 100 nm, a spectrometer having a high resolution equal to or lower than about 1 nm may be implemented. Since the thicknesses of the first, second, and third spectrum modulation portions 210, 220, and 230 are easily adjustable, a high-resolution spectrometer may be easily manufactured.

Figure 3:
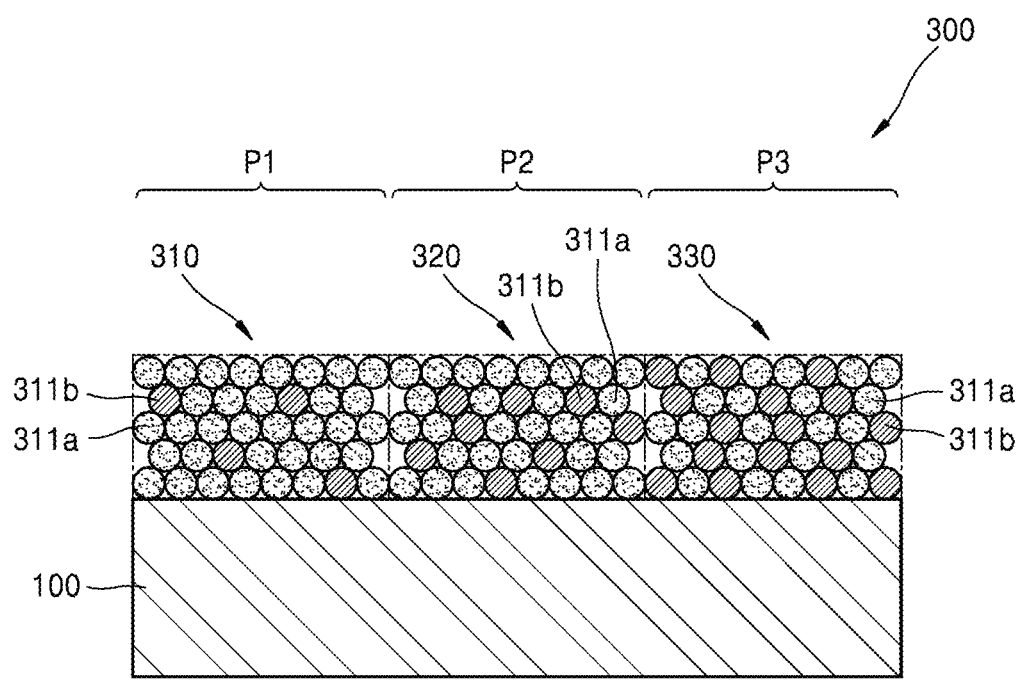
FIG. 3 is a cross-sectional view of a light filter according to another exemplary embodiment.

FIG. 3 is a cross-sectional view of a light filter 300 according to another exemplary embodiment.

Referring to FIG. 3, the light filter 300 includes a plurality of partial filters arranged in an array form, e.g., first, second, and third partial filters P1, P2, and P3. FIG. 3 illustrates only three partial filters for brevity. The first, second, and third partial filters P1, P2, and P3 may be arranged in a two-dimensional array or a one-dimensional array.

The first, second, and third partial filters P1, P2, and P3 include first, second, and third spectrum modulation portions 310, 320, and 330, respectively. The first, second, and third spectrum modulation portions 310, 320, and 330 may have the same thickness. For example, the first, second, and third spectrum modulation portions 310, 320, and 330 may have a thickness range of about 10 nm to about 100 μm, but are not limited thereto.

The first, second, and third spectrum modulation portions 310, 320, and 330 may each include QDs of two types. The QDs of the two types include first and second QDs 311a and 311b having at least one of different sizes and different materials. For example, the QDs of the two types may include the first and second QDs 311a and 311b having different sizes or include the first and second QDs 311a and 311b having different materials. Otherwise, the QDs of the two types may include the first and second QDs 311a and 311b having different sizes and different materials.

Specifically, for example, the QDs of the two types may include the first QDs 311a configured as CdSe particles having a diameter of about 4 nm, and the second QDs 311b configured as CdSe particles having a diameter of about 5 nm. Alternatively, the QDs of the two types may include the first QDs 311a configured as CdSe particles having a diameter of about 4 nm, and the second QDs 311b configured as CdS particles having a diameter of about 4 nm. Otherwise, the QDs of the two types may include the first QDs 311a configured as CdSe particles having a diameter of about 4 nm, and the second QDs 311b configured as CdS particles having a diameter of about 5 nm.

In the current exemplary embodiment, to allow the first, second, and third partial filters P1, P2, and P3 to generate different transmittance spectra, the first, second, and third spectrum modulation portions 310, 320, and 330 may have different QD mixing ratios. In other words, the first, second, and third spectrum modulation portions 310, 320, and 330 may have different mixing ratios of the first and second QDs 311a and 311b.

Specifically, for example, the first spectrum modulation layer 310 may have a mixing ratio of the first and second QDs 311a and 311b of 0.01:0.99, the second spectrum modulation layer 320 may have a mixing ratio of the first and second QDs 311a and 311b of 0.02:0.98, and the third spectrum modulation layer 330 may have a mixing ratio of the first and second QDs 311a and 311b of 0.03:0.97. However, the above-mentioned QD mixing ratios are merely examples and the current embodiment is not limited thereto.

As described above, the first, second, and third partial filters P1, P2, and P3 may generate different transmittance spectra when the first, second, and third spectrum modulation portions 310, 320, and 330 have different mixing ratios of the first and second QDs 311a and 311b. For example, if 100 or more different transmittance spectra are generated as described above within a wavelength range of about 100 nm, a spectrometer having a high resolution equal to or lower than about 1 nm may be implemented. Since the QD mixing ratios of the first, second, and third spectrum modulation portions 310, 320, and 330 are easily determined, a high-resolution spectrometer may be easily manufactured.

In the above description, the first, second, and third spectrum modulation portions 310, 320, and 330 each include QDs of two types. However, the QDs of the two types are merely an example and the first, second, and third spectrum modulation portions 310, 320, and 330 may each include QDs of three or more types. Herein, the QDs of the three types may include first, second, and third QDs having at least one of different sizes and different materials.

Figure 4:
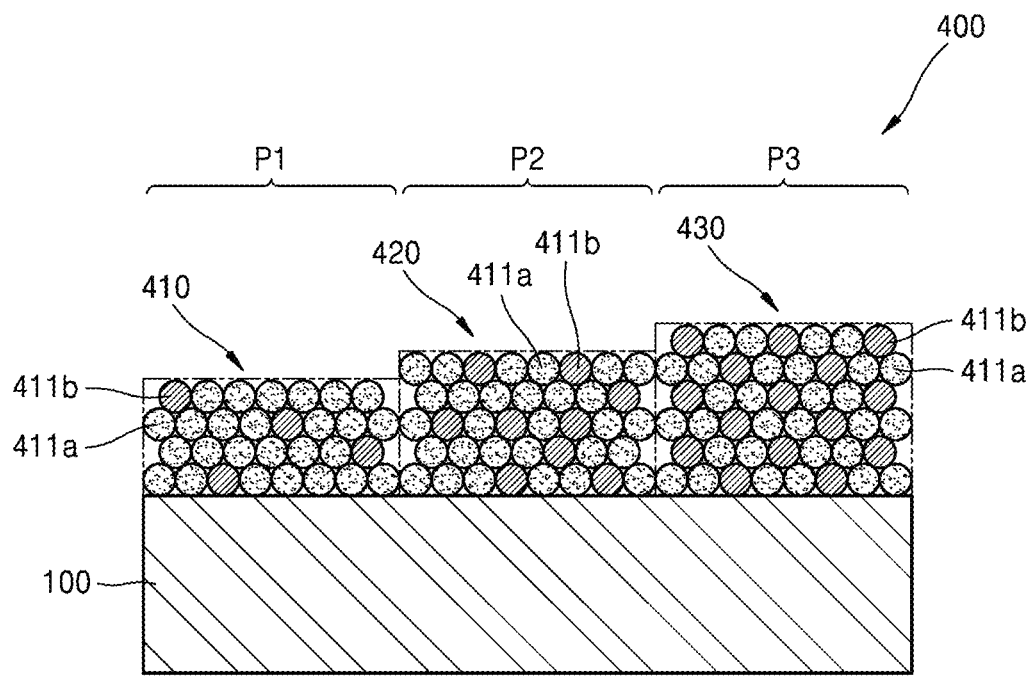
FIG. 4 is a cross-sectional view of a light filter according to another exemplary embodiment.

FIG. 4 is a cross-sectional view of a light filter 400 according to another exemplary embodiment.

Referring to FIG. 4, the light filter 400 includes a plurality of partial filters arranged in an array form, e.g., first, second, and third partial filters P1, P2, and P3. FIG. 4 illustrates only three partial filters for brevity. The first, second, and third partial filters P1, P2, and P3 include first, second, and third spectrum modulation portions 410, 420, and 430, respectively.

In the current exemplary embodiment, to allow the first, second, and third partial filters P1, P2, and P3 to generate different transmittance spectra, the first, second, and third spectrum modulation portions 410, 420, and 430 may have different QD mixing ratios and different thicknesses. Descriptions regarding different QD mixing ratios and different thicknesses have been provided above in relation to FIGS. 4 and 3 and thus are not provided herein.

Figure 5:
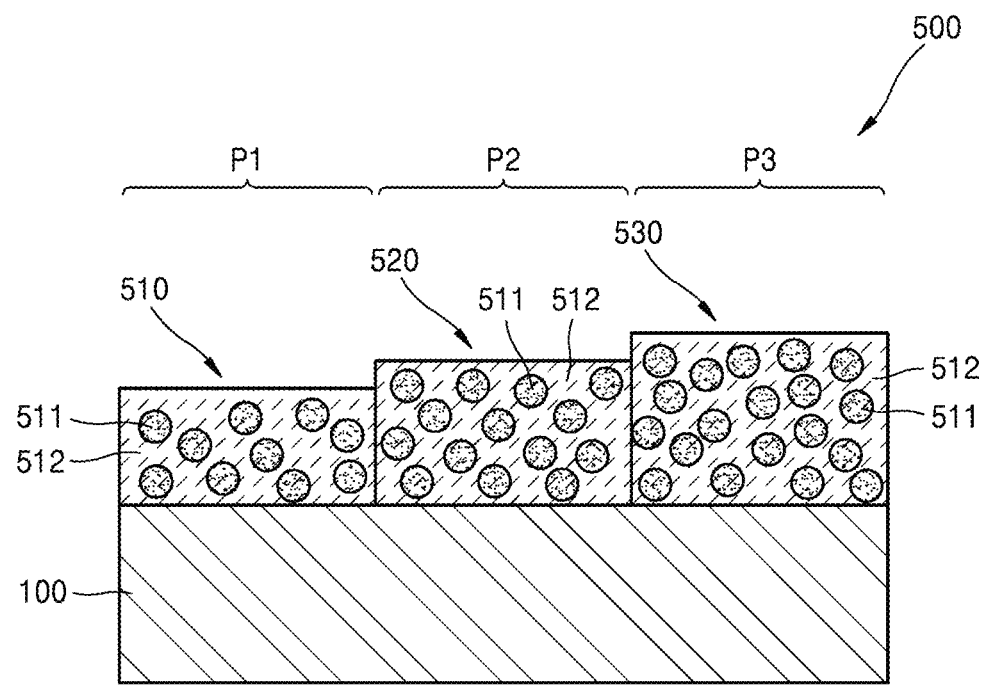
FIG. 5 is a cross-sectional view of a light filter according to another exemplary embodiment.

FIG. 5 is a cross-sectional view of a light filter 500 according to another exemplary embodiment.

Referring to FIG. 5, the light filter 500 includes a plurality of partial filters arranged in an array form, e.g., first, second, and third partial filters P1, P2, and P3. FIG. 5 illustrates only three partial filters for brevity. The first, second, and third partial filters P1, P2, and P3 include first, second, and third spectrum modulation portions 510, 520, and 530, respectively.

The first, second, and third spectrum modulation portions 510, 520, and 530 may each include QDs 511 and a polymer 512. Herein, the QDs 511 may be of a single type. The QDs of the single type refer to QDs having the same size and including the same material. The QDs 511 may be dispersed in the polymer 512. The polymer 512 may include, for example, poly(2-methoxy-5-(2-ethylhexyloxy)-1,4-phenylenevinylene) (MEH-PPV) or poly(3-hexylthiophene) (P3HT). However, the above-mentioned materials are merely examples and the polymer 512 may include other various organic materials.

In the current exemplary embodiment, to allow the first, second, and third partial filters P1, P2, and P3 to generate different transmittance spectra, the first, second, and third spectrum modulation portions 510, 520, and 530 may have different thicknesses. The first, second, and third spectrum modulation portions 510, 520, and 530 may have a thickness range of, for example, about 10 nm to about 100 µm, but are not limited thereto.

Figure 6:
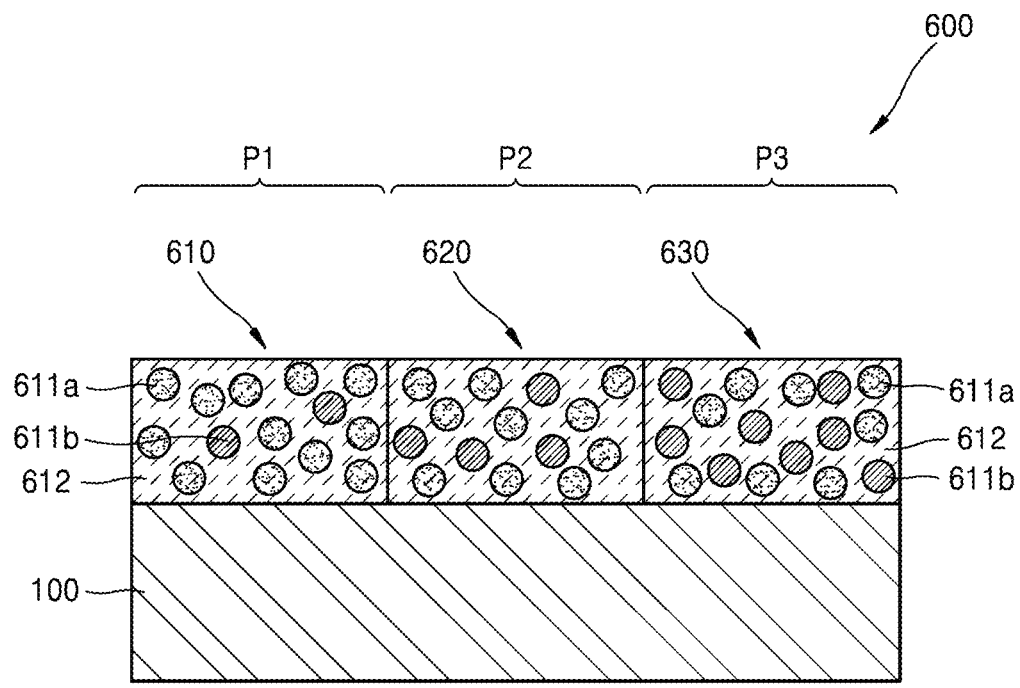
FIG. 6 is a cross-sectional view of a light filter according to another exemplary embodiment.

FIG. 6 is a cross-sectional view of a light filter 600 according to another exemplary embodiment.

Referring to FIG. 6, the light filter 600 includes a plurality of partial filters arranged in an array form, e.g., first, second, and third partial filters P1, P2, and P3. The first, second, and third partial filters P1, P2, and P3 include first, second, and third spectrum modulation portions 610, 620, and 630, respectively. The first, second, and third spectrum modulation portions 610, 620, and 630 may have the same thickness. For example, the first, second, and third spectrum modulation portions 610, 620, and 630 may have a thickness range of about 10 nm to about 100 µm, but are not limited thereto.

The first, second, and third spectrum modulation portions 610, 620, and 630 may each include QDs of two types and a polymer 612. The QDs of the two types may include first and second QDs 611a and 611b having at least one of different sizes and different materials.

The first and second QDs 611a and 611b of the two types may be dispersed in the polymer 612. The polymer 612 may include, for example, MEH-PPV or P3HT. However, the above-mentioned materials are merely examples and the polymer 612 may include other various organic materials.

In the current exemplary embodiment, to allow the first, second, and third partial filters P1, P2, and P3 to generate different transmittance spectra, the first, second, and third spectrum modulation portions 610, 620, and 630 may have different mixing ratios of the materials thereof. The first, second, and third spectrum modulation portions 610, 620, and 630 may have different mixing ratios of at least two of the first QDs 611a, the second QDs 611b, and the polymer 612. Specifically, for example, the first, second, and third spectrum modulation portions 610, 620, and 630 may have different mixing ratios of the first and second QDs 611a and 611b. Alternately, the first, second, and third spectrum modulation portions 610, 620, and 630 may have different mixing ratios of at least one of the first and second QDs 611a and 611b, and the polymer 612.

In the above description, the first, second, and third spectrum modulation portions 610, 620, and 630 each include QDs of two types and a polymer. However, the QDs of the two types are merely an example, the current exemplary embodiment is not limited thereto, and the first, second, and third spectrum modulation portions 610, 620, and 630 may each include QDs of three or more types and the polymer. In this case, the first, second, and third spectrum modulation portions 610, 620, and 630 may have different mixing ratios of at least two of the three types of QDs and the polymer.

Although the first, second, and third spectrum modulation portions 610, 620, and 630 have the same thickness and different mixing ratios of materials thereof in the above description, the first, second, and third spectrum modulation portions 610, 620, and 630 may have different thicknesses and also different mixing ratios of materials thereof.

Figure 7:
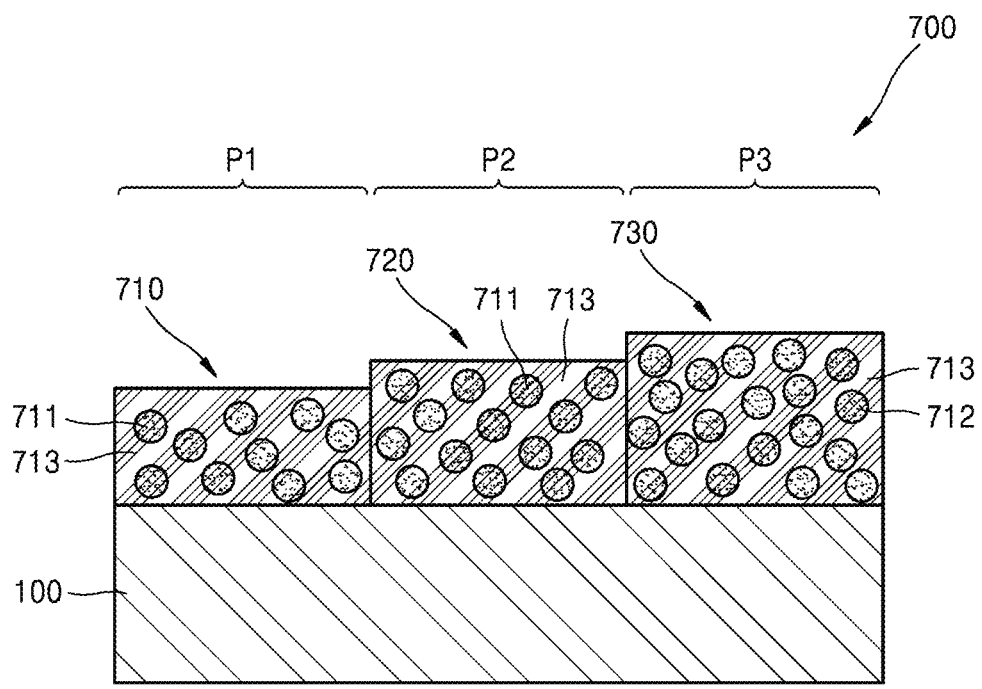
FIG. 7 is a cross-sectional view of a light filter according to another exemplary embodiment.

FIG. 7 is a cross-sectional view of a light filter 700 according to another exemplary embodiment.

Referring to FIG. 7, the light filter 700 includes a plurality of partial filters arranged in an array form, e.g., first, second, and third partial filters P1, P2, and P3. The first, second, and third partial filters P1, P2, and P3 include first, second, and third spectrum modulation portions 710, 720, and 730, respectively. The first, second, and third spectrum modulation portions 710, 720, and 730 may each include QDs of a single type 711 and an inorganic material 713, and may have different thicknesses. The QDs 711 may be dispersed in the inorganic material 713. The inorganic material 713 may include, for example, a group-VI semiconductor material, a group-III-V compound semiconductor material, or a group- II-VI compound semiconductor material. However, the above-mentioned materials are merely examples and the inorganic material 713 may include other various materials. Descriptions other than the above description have been provided above and thus are not provided herein.

Figure 8:
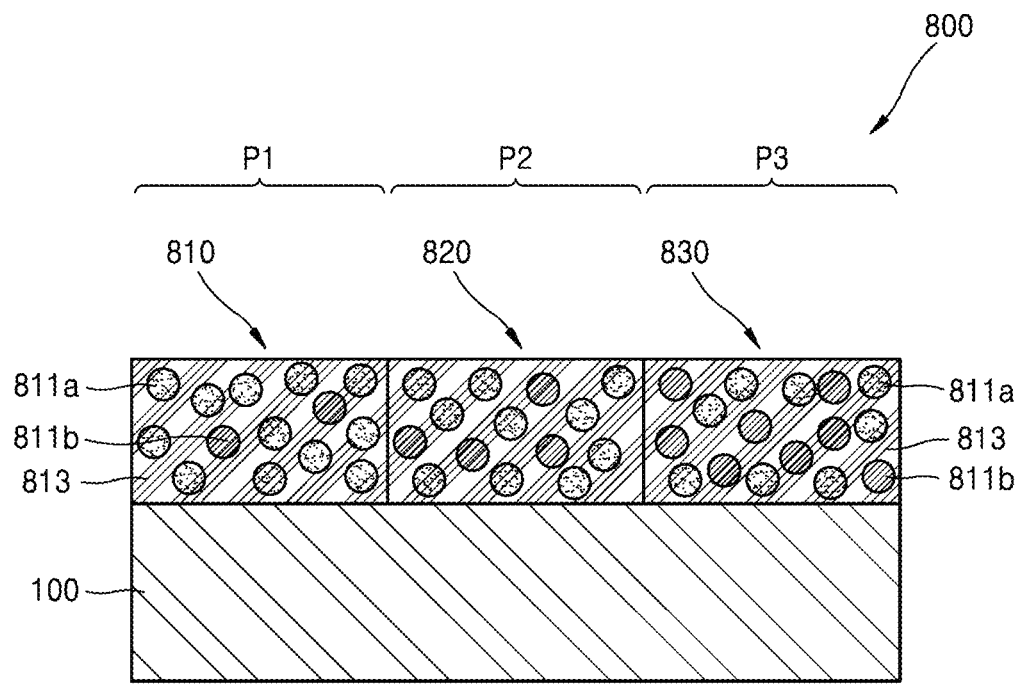
FIG. 8 is a cross-sectional view of a light filter according to another exemplary embodiment.

FIG. 8 is a cross-sectional view of a light filter 800 according to another exemplary embodiment.

Referring to FIG. 8, the light filter 800 includes a plurality of partial filters arranged in an array form, e.g., first, second, and third partial filters P1, P2, and P3. The first, second, and third partial filters P1, P2, and P3 include first, second, and third spectrum modulation portions 810, 820, and 830, respectively.

The first, second, and third spectrum modulation portions 810, 820, and 830 may have the same thickness and include QDs of two types mixed at different mixing ratios, e.g., first and second QDs 811a and 811b, and an inorganic material 813. The first and second QDs 811a and 811b may be dispersed in the inorganic material 813. The inorganic material 713 may include, for example, a group-VI semiconductor material, a group-III-V compound semiconductor material, or a group-II-VI compound semiconductor material, but is not limited thereto. Descriptions other than the above description have been provided above and thus are not provided herein.

Figure 9:
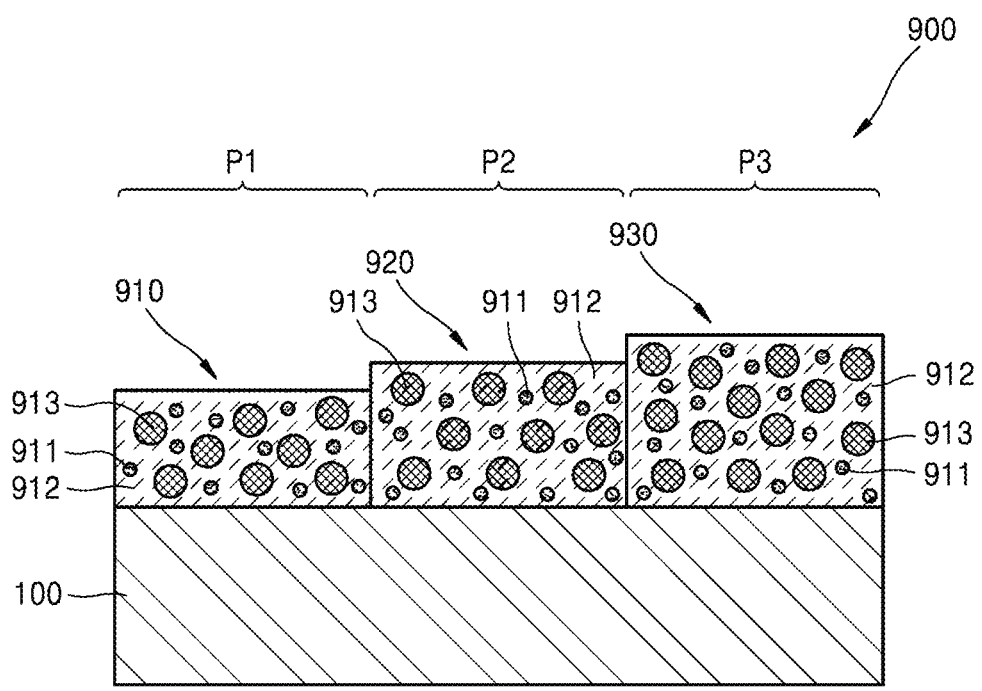
FIG. 9 is a cross-sectional view of a light filter according to another exemplary embodiment.

FIG. 9 is a cross-sectional view of a light filter 900 according to another exemplary embodiment.

Referring to FIG. 9, the light filter 900 includes a plurality of partial filters arranged in an array form, e.g., first, second, and third partial filters P1, P2, and P3. The first, second, and third partial filters P1, P2, and P3 include first, second, and third spectrum modulation portions 910, 920, and 930, respectively.

The first, second, and third spectrum modulation portions 910, 920, and 930 may each include QDs 911, an inorganic material 913, and a polymer 912. Herein, the QDs 911 may include QDs of a single type. The inorganic material 913 may include, for example, a group-VI semiconductor material, a group-III-V compound semiconductor material, or a group-II-VI compound semiconductor material, but is not limited thereto. The polymer 612 may include, for example, MEH-PPV or P3HT, but is not limited thereto.

In the current exemplary embodiment, to allow the first, second, and third partial filters P1, P2, and P3 to generate different transmittance spectra, the first, second, and third spectrum modulation portions 910, 920, and 930 may have different thicknesses. The first, second, and third spectrum modulation portions 910, 920, and 930 may have a thickness range of, for example, about 10 nm to about 100 μm, but are not limited thereto.

In the above description, the first, second, and third spectrum modulation portions 910, 920, and 930 include QDs of a single type. However, the first, second, and third spectrum modulation portions 910, 920, and 930 may include QDs of two or more types. In this case, the first, second, and third partial filters P1, P2, and P3 may generate different transmittance spectra when the first, second, and third spectrum modulation portions 910, 920, and 930 have different mixing ratios of at least two of materials thereof (i.e., the QDs of the two or more types, the inorganic material, and the polymer). The first, second, and third spectrum modulation portions 910, 920, and 930 may have the same thickness or different thicknesses.

Figure 10:
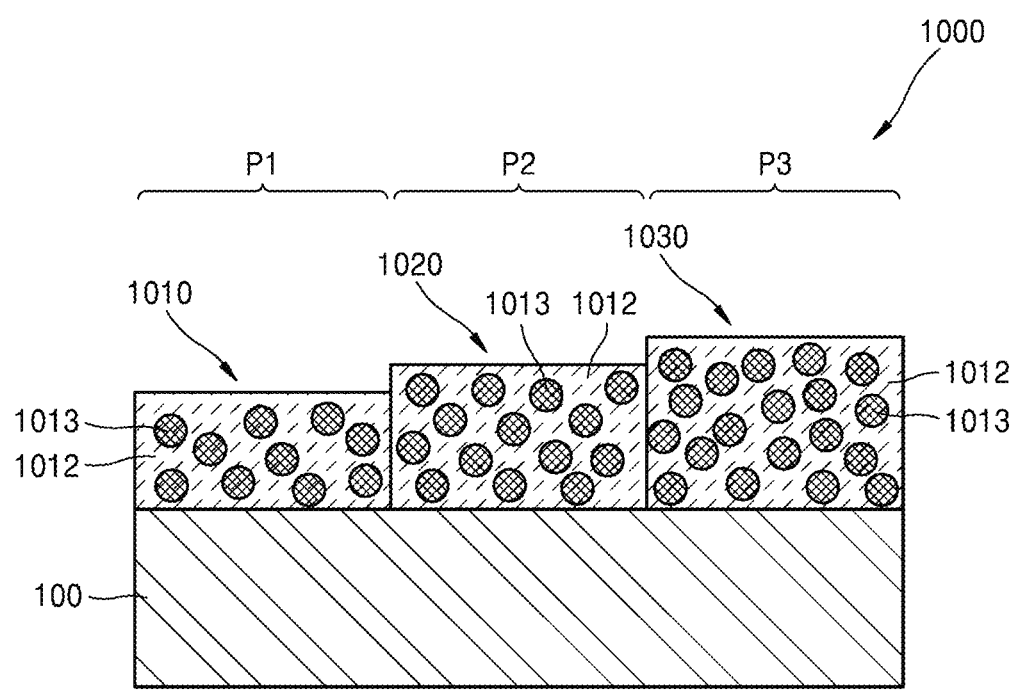
FIG. 10 is a cross-sectional view of a light filter according to another exemplary embodiment.

FIG. 10 is a cross-sectional view of a light filter 1000 according to another exemplary embodiment.

Referring to FIG. 10, the light filter 1000 includes a plurality of partial filters arranged in an array form, e.g., first, second, and third partial filters P1, P2, and P3. The first, second, and third partial filters P1, P2, and P3 include first, second, and third spectrum modulation portions 1010, 1020, and 1030, respectively.

The first, second, and third spectrum modulation portions 1010, 1020, and 1030 may each include an inorganic material 1013 and a polymer 1012. The inorganic material 1013 may include, for example, a group-VI semiconductor material, a group-III-V compound semiconductor material, or a group-II-VI compound semiconductor material, but is not limited thereto. The polymer 1012 may include, for example, MEH-PPV or P3HT, but is not limited thereto.

In the current exemplary embodiment, to allow the first, second, and third partial filters P1, P2, and P3 to generate different transmittance spectra, the first, second, and third spectrum modulation portions 1010, 1020, and 1030 may have different thicknesses.

In the above description, different transmittance spectra are generated when the first, second, and third spectrum modulation portions 1010, 1020, and 1030 including the inorganic material 1013 and the polymer 1012 have different thicknesses. Alternatively, different transmittance spectra may be generated when the first, second, and third spectrum modulation portions 1010, 1020, and 1030 have different mixing ratios of materials thereof, i.e., the inorganic material 1013 and the polymer 1012. Herein, the first, second, and third spectrum modulation portions 1010, 1020, and 1030 may have the same thickness or different thicknesses.

Figure 11:
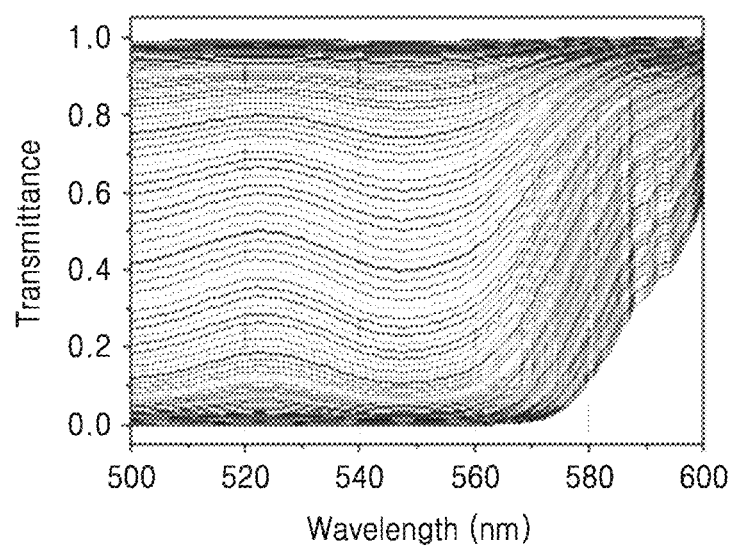
FIG. 11 is a graph showing a simulation result of transmittance spectra of partial filters including quantum dots (QDs) of a single type and having different thicknesses, according to an exemplary embodiment.

FIG. 11 is a graph showing a simulation result of transmittance spectra of partial filters including QDs of a single type and having different thicknesses. Herein, CdSe particles having a diameter of about 5 nm are used as the QDs of the single type, and 100 spectrum modulation portions are produced by varying the thickness of the partial filter by about 30 nm between about 10 nm and about 3 μm.

Referring to FIG. 11, the partial filters including the QDs of the single type and having the different thicknesses generate 100 different transmittance spectra in a wavelength range of about 500 nm to about 600 nm. As shown in FIG. 11, these transmittance spectra neither are parallel to one another nor intersect one another. Therefore, a high-resolution spectrometer capable of accurately calculating an input spectrum without an error in calculation may be produced.

Figure 12A:
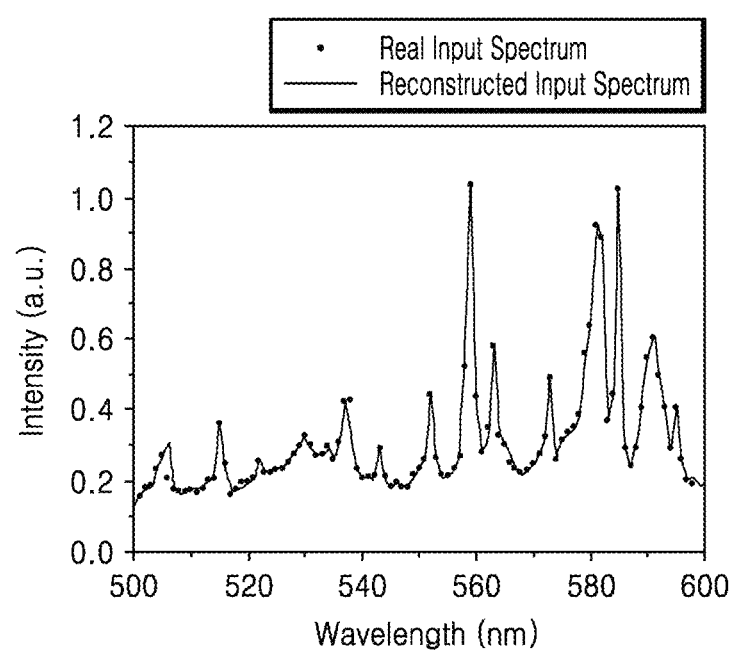
FIGS. 12A and 12B are graphs comparatively showing a real input spectrum and an input spectrum reconstructed based on the result shown in FIG. 11, according to an exemplary embodiment.
Figure 12B:
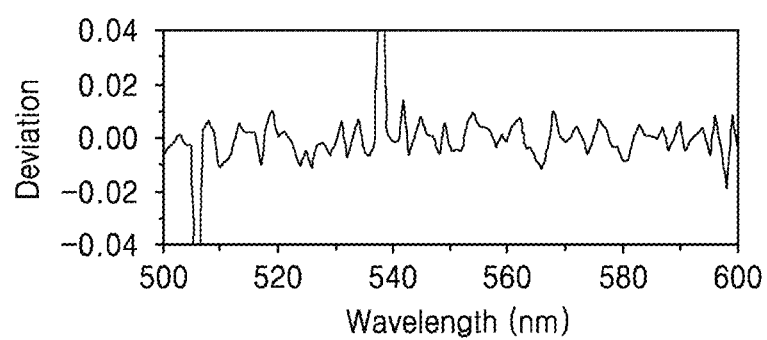

FIGS. 12A and 12B are graphs comparatively showing a real input spectrum and an input spectrum reconstructed based on the result shown in FIG. 11. Herein, the reconstructed input spectrum may be calculated using Equation 1 shown above. This principle is equally applied hereinafter.

Referring to FIGS. 12A and 12B, since a very small deviation of about 1% is present between the real input spectrum and the reconstructed input spectrum, the reconstructed input spectrum is almost the same as the real spectrum input to the partial filters. As such, it is evident that the real input spectrum may be accurately measured based on the reconstructed input spectrum.

To calculate the reconstructed input spectrum, the transmittance spectra of the partial filters may have different forms. For example, transmittance spectra of the partial filters which are parallel to one another as shown in FIG. 13A or transmittance spectra of the partial filters which intersect one another as shown in FIG. 13B are not desirable because an input spectrum is not easily calculable or accuracy of calculation is reduced. When partial filters are produced by appropriately adjusting thicknesses of spectrum modulation portions including QDs of a single type as in the current exemplary embodiment, transmittance spectra may be generated in different forms as shown in FIG. 11.

Figure 14:
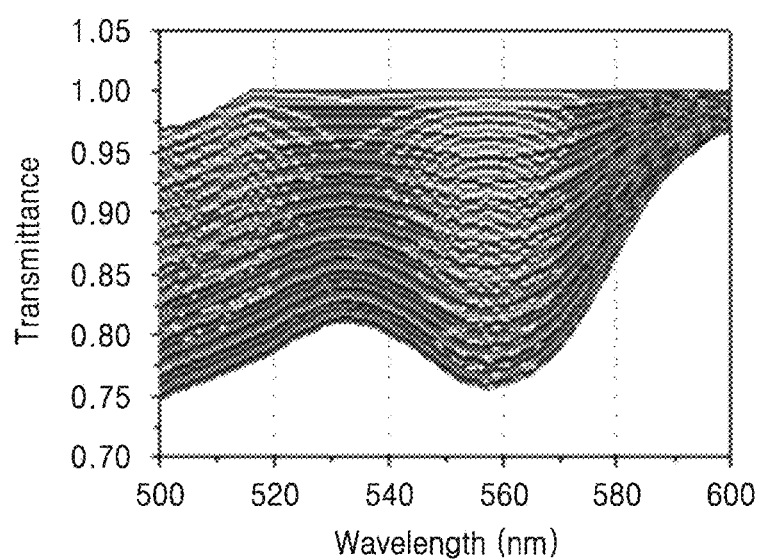
FIG. 14 is a graph showing a simulation result of transmittance spectra of partial filters including QDs of two types and having different QD mixing ratios, according to an exemplary embodiment.

FIG. 14 is a graph showing a simulation result of transmittance spectra of partial filters including QDs of two types and having different QD mixing ratios. Herein, CdSe particles having a diameter of about 5 nm and CdSe particles having a diameter of about 4 nm are used as the QDs of the two types. 100 spectrum modulation layers are produced by varying the mixing ratio of the QDs of the two types to 0.01:0.99, 0.02:098, . . . , 0.99:0.01, and 1.00:0.00.

Referring to FIG. 14, the partial filters including the QDs of the two types and having the different QDs mixing ratios generate 100 different transmittance spectra in a wavelength range of about 500 nm to about 600 nm. As such, a high-resolution spectrometer may be implemented.

Figure 15A:
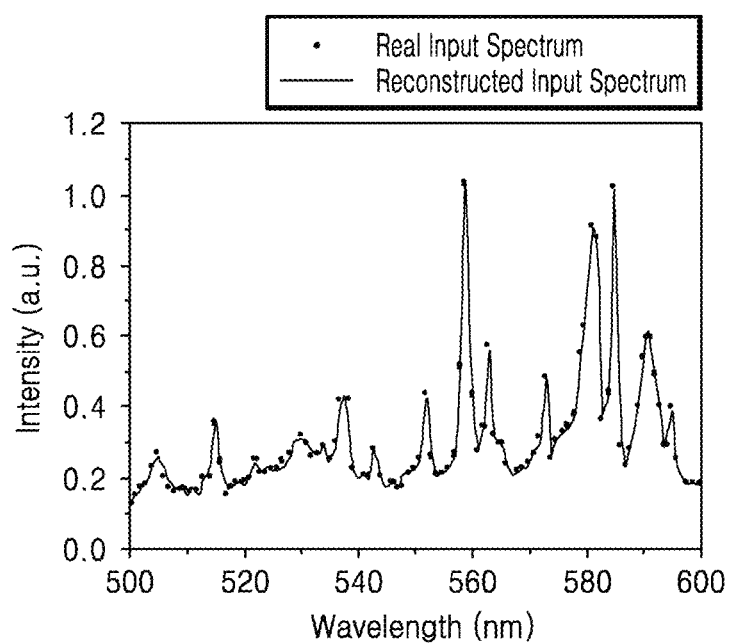
FIGS. 15A and 15B are graphs comparatively showing a real input spectrum and an input spectrum reconstructed based on the result shown in FIG. 14, according to an exemplary embodiment.
Figure 15B:
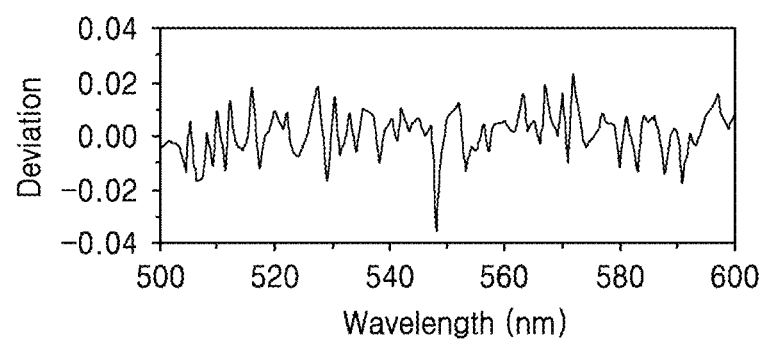

FIGS. 15A and 15B are graphs comparatively showing a real input spectrum and an input spectrum reconstructed based on the result shown in FIG. 14, according to an exemplary embodiment.

Referring to FIGS. 15A and 15B, since a very small deviation of about 1% to about 2% is present between the real input spectrum and the reconstructed input spectrum, the reconstructed input spectrum is almost the same as the real spectrum input to the partial filters.

Figure 16:
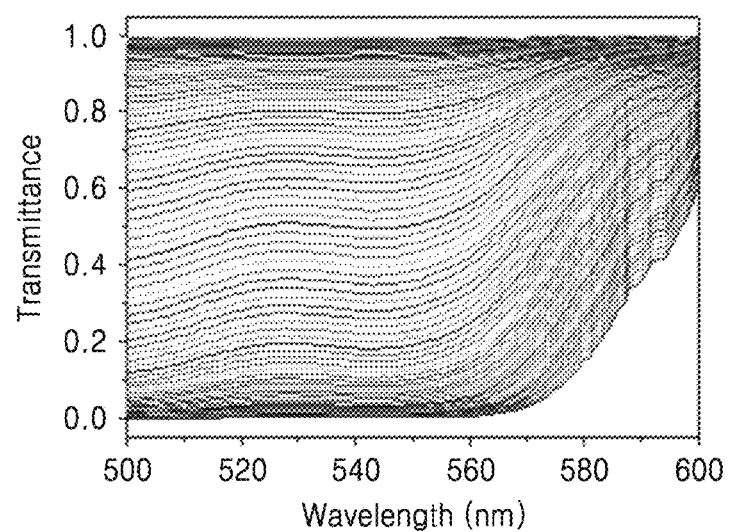
FIG. 16 is a graph showing a simulation result of transmittance spectra of partial filters including QDs of ten types and having different thicknesses, according to an exemplary embodiment.

FIG. 16 is a graph showing a simulation result of transmittance spectra of partial filters including QDs of ten types and having different thicknesses, according to an exemplary embodiment. Herein, CdSe particles having diameters of about 4.1 nm, about 4.2 nm, . . . , about 4.9 nm, and about 5.0 nm are used as the QDs of the ten types. 100 spectrum modulation portions are produced by configuring ten groups corresponding to the QDs of the ten types and by varying the thickness of the partial filter per each group.

Referring to FIG. 16, the partial filters including the QDs of the ten types and having the different thicknesses generate 100 different transmittance spectra in a wavelength range of about 500 nm to about 600 nm.

Figure 17A:
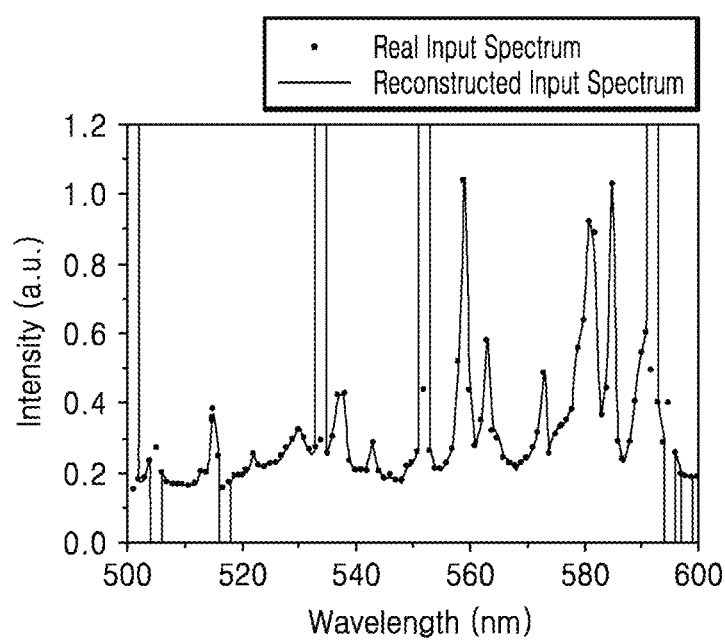
FIGS. 17A and 17B are graphs comparatively showing a real input spectrum and an input spectrum reconstructed based on the result shown in FIG. 16, according to an exemplary embodiment.
Figure 17B:
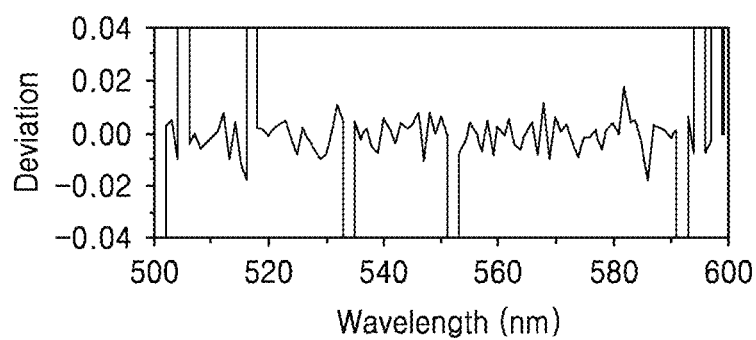

FIGS. 17A and 17B are graphs comparatively showing a real input spectrum and an input spectrum reconstructed based on the result shown in FIG. 16, according to an exemplary embodiment.

Referring to FIGS. 17A and 17B, since a very small deviation of about 1% is present between the real input spectrum and the reconstructed input spectrum, the reconstructed input spectrum is almost the same as the real spectrum input to the partial filters. As such, the real input spectrum may be accurately measured based on the reconstructed input spectrum.

Figure 18:
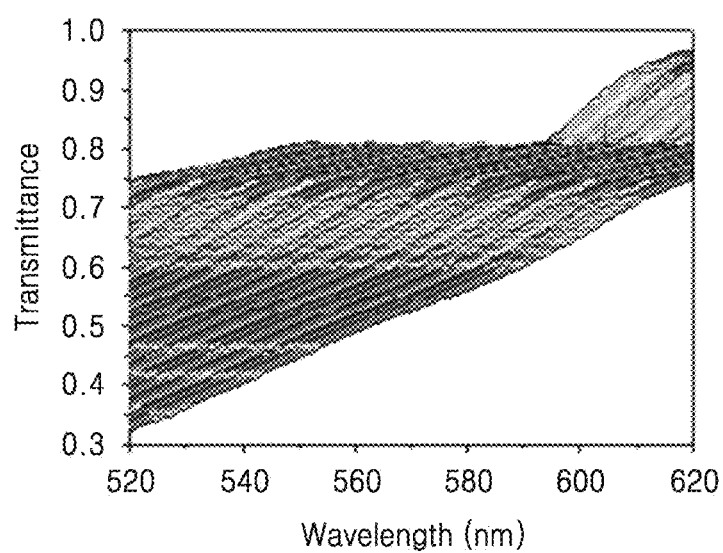
FIG. 18 is a graph showing a simulation result of transmittance spectra of partial filters including QDs of eleven types and having different QD mixing ratios, according to an exemplary embodiment.

FIG. 18 is a graph showing a simulation result of transmittance spectra of partial filters including QDs of eleven types and having different QD mixing ratios, according to an exemplary embodiment. Herein, CdSe particles having diameters of about 4.0 nm, about 4.1 nm, . . . , about 4.9 nm, and about 5.0 nm are used as the QDs of the eleven types. 100 spectrum modulation portions are produced by configuring ten groups each corresponding to two of the QDs of the eleven types and by varying the thickness of the partial filter per each group.

Referring to FIG. 18, the partial filters including the QDs of the eleven types and having the different QD mixing ratios generate 100 different transmittance spectra in a wavelength range of about 520 nm to about 620 nm.

Figure 19A:
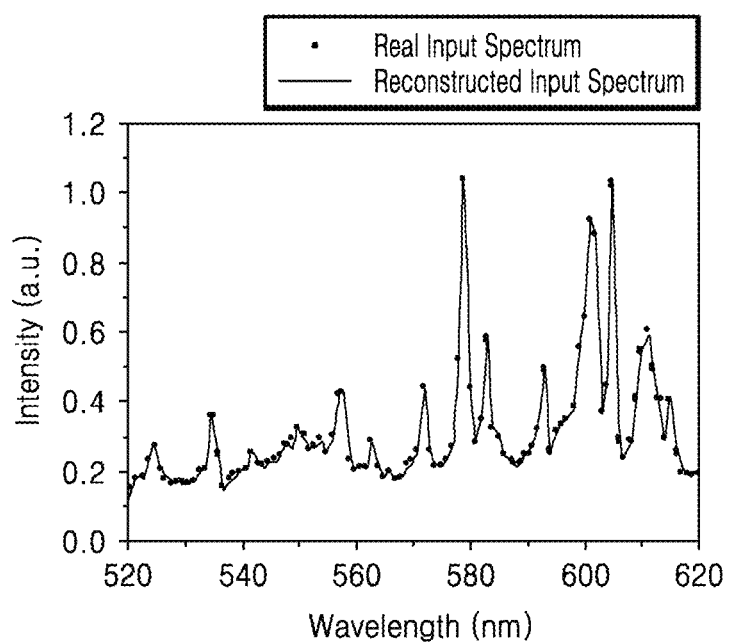
FIGS. 19A and 19B are graphs comparatively showing a real input spectrum and an input spectrum reconstructed based on the result shown in FIG. 18, according to an exemplary embodiment.
Figure 19B:
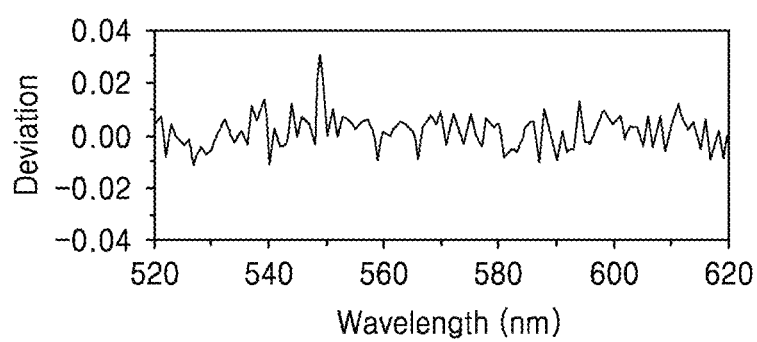

FIGS. 19A and 19B are graphs comparatively showing a real input spectrum and an input spectrum reconstructed based on the result shown in FIG. 18, according to an exemplary embodiment.

Referring to FIGS. 19A and 19B, since a very small deviation of about 1% is present between the real input spectrum and the reconstructed input spectrum, the reconstructed input spectrum is almost the same as the real spectrum input to the partial filters. As such, the real input spectrum may be accurately measured based on the reconstructed input spectrum.

Figure 20:
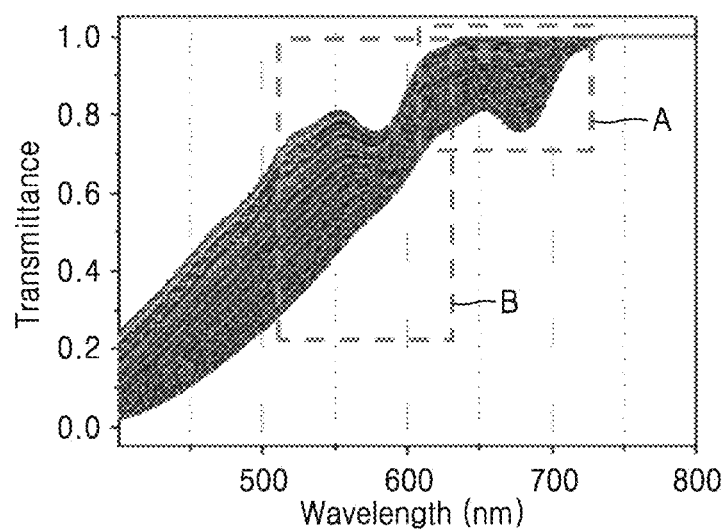
FIG. 20 is a graph showing a simulation result of transmittance spectra of partial filters including QDs of two types and having different QD mixing ratios, according to an exemplary embodiment.

FIG. 20 is a graph showing a simulation result of transmittance spectra of partial filters including QDs of two types and having different QD mixing ratios, according to an exemplary embodiment. FIG. 20 shows transmittance spectra in a wavelength range of about 400 nm to about 800 nm. Herein, CdSe particles having a diameter of about 5 nm and CdSe particles having a diameter of about 4 nm are used as the QDs of the two types. 100 spectrum modulation portions are produced by varying the mixing ratio of the QDs of the two types to 0.01:0.99, 0.02:098, . . . , 0.99:0.01, and 1.00:0.00.

Figure 21:
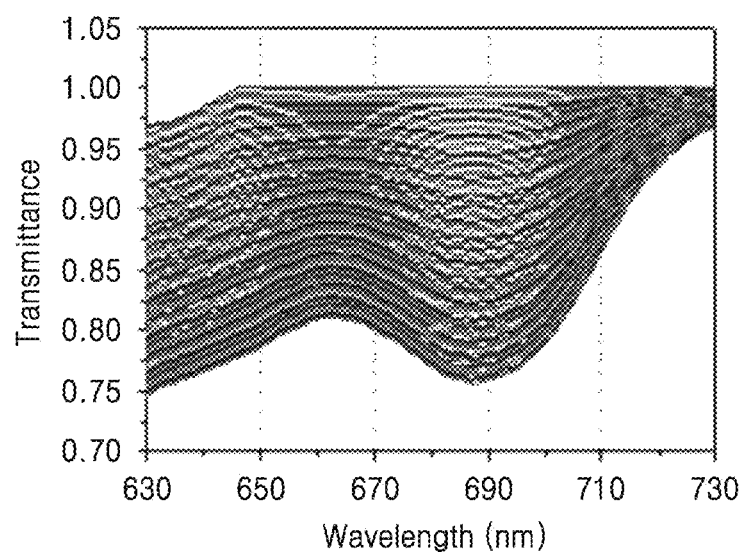
FIG. 21 is a magnified view of portion A of FIG. 20.
Figure 22A:
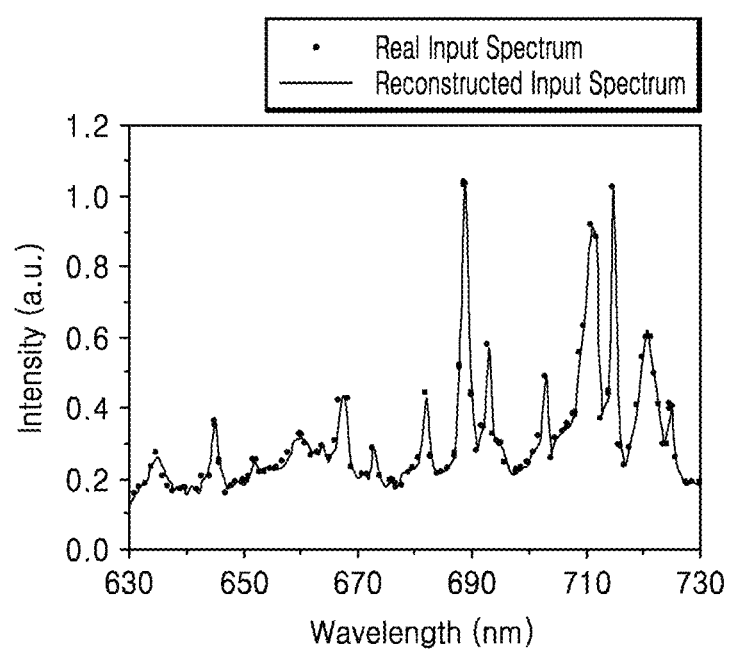
FIGS. 22A and 22B are graphs comparatively showing a real input spectrum and an input spectrum reconstructed based on the result shown in FIG. 21, according to an exemplary embodiment.
Figure 22B:
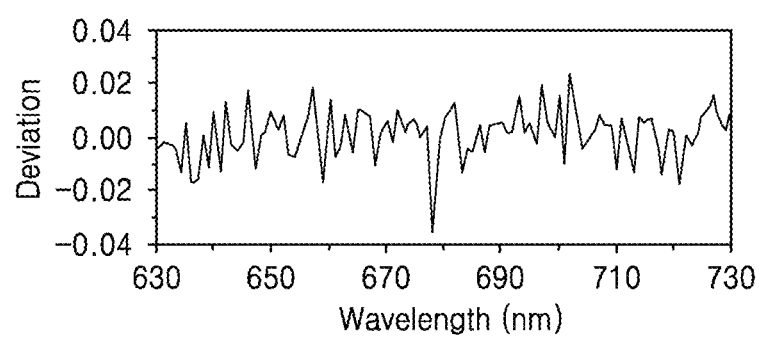

FIG. 21 is a magnified view of portion A of FIG. 20. FIG. 21 shows a wavelength range of about 630 nm to about 730 nm of the transmittance spectra shown in FIG. 20. FIGS. 22A and 22B are graphs comparatively showing a real input spectrum and an input spectrum reconstructed based on the result shown in FIG. 21. Referring to FIGS. 22A and 22B, a deviation of about 1% to about 2% is present between the real input spectrum and the reconstructed input spectrum in the wavelength range of about 630 nm to about 730 nm.

Figure 23:
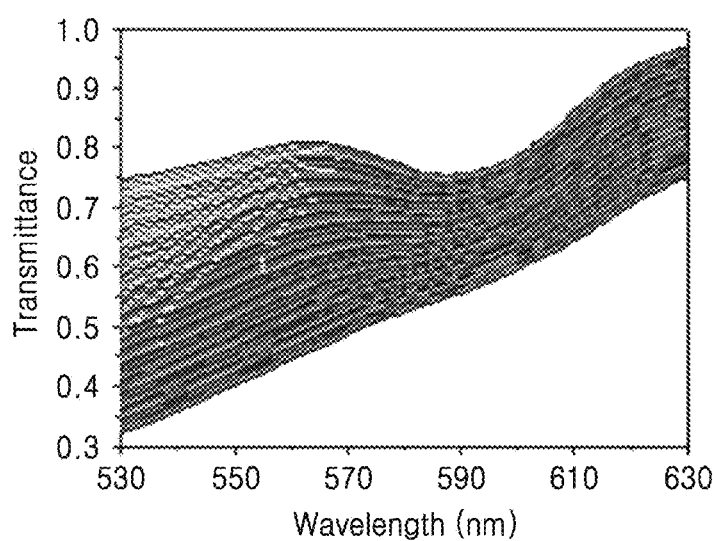
FIG. 23 is a magnified view of portion B of FIG. 20.
Figure 24A:
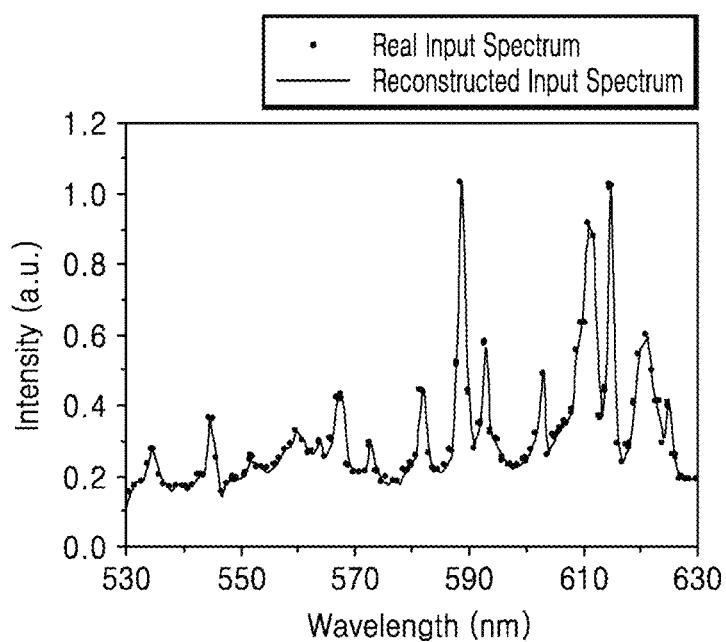
FIGS. 24A and 24B are graphs comparatively showing a real input spectrum and an input spectrum reconstructed based on the result shown in FIG. 23, according to an exemplary embodiment.
Figure 24B:
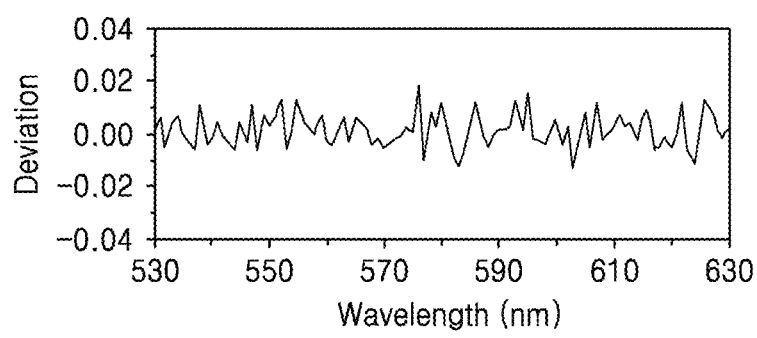

FIG. 23 is a magnified view of portion B of FIG. 20. FIG. 23 shows a wavelength range of about 530 nm to about 630 nm of the transmittance spectra shown in FIG. 20. FIGS. 24A and 24B are graphs comparatively showing a real input spectrum and an input spectrum reconstructed based on the result shown in FIG. 23. Referring to FIGS. 24A and 24B, a deviation of about 1% is present between the real input spectrum and the reconstructed input spectrum in the wavelength range of about 530 nm to about 630 nm.

As described above, the deviation between the real input spectrum and the reconstructed input spectrum in the wavelength range of about 530 nm to about 630 nm is smaller than that in the wavelength range of about 630 nm to about 730 nm. Therefore, accuracy of the reconstructed input spectrum may be increased by selecting an appropriate wavelength range.

Figure 25:
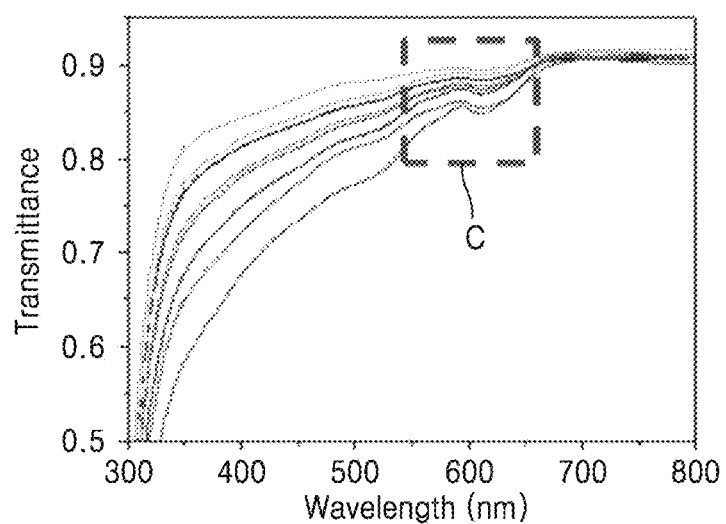
FIG. 25 is a graph showing a test result of transmittance spectra of partial filters including QDs of a single type and a polymer and having different thicknesses, according to an exemplary embodiment.

FIG. 25 is a graph showing a test result of transmittance spectra of partial filters including QDs of a single type and a polymer and having different thicknesses, according to an exemplary embodiment. Herein, CdSe particles having a diameter of about 5 nm are used as the QDs of the single type, and eight spectrum modulation portions are produced by varying the thickness of the partial filter by about 20 nm to about 30 nm.

Figure 26:
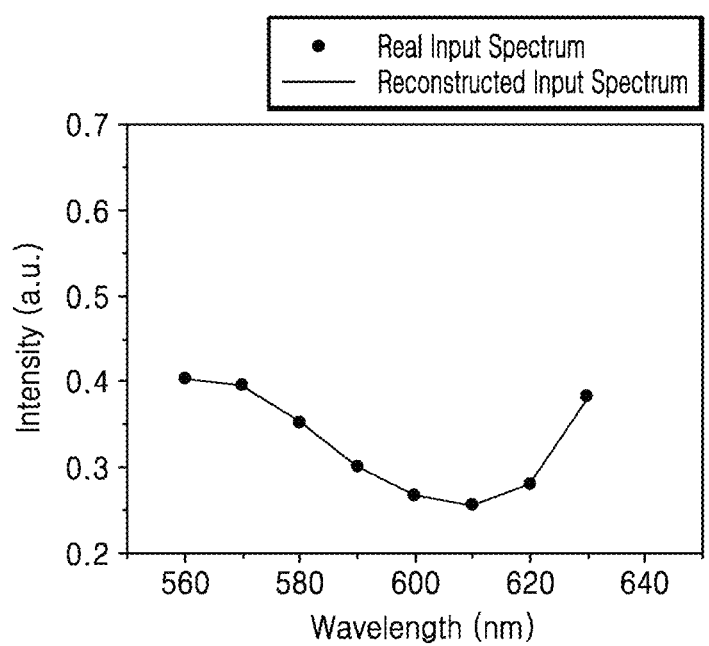
FIG. 26 is a graph comparatively showing a real input spectrum and an input spectrum reconstructed based on the result shown in FIG. 25, in a wavelength range corresponding to portion C of FIG. 25, according to an exemplary embodiment.

FIG. 26 is a graph comparatively showing a real input spectrum and an input spectrum reconstructed based on the result shown in FIG. 25, in a wavelength range corresponding to portion C of FIG. 25. FIG. 26 shows a result of measuring eight pieces of data at an interval of about 10 nm in a wavelength range of about 560 nm to about 630 nm. Referring to FIG. 26, the reconstructed input spectrum is almost exactly the same as the real input spectrum. As such, a high-accuracy reconstructed input spectrum may be obtained.

According to the afore-described exemplary embodiments, partial filters may generate different forms of transmittance spectra when spectrum modulation portions of the partial filters have different thicknesses or different mixing ratios of materials thereof. Therefore, if 100 or more transmittance spectra are generated in a wavelength range of about 100 nm, a high resolution equal to or lower than about 1 nm may be implemented. In addition, since the thicknesses or the mixing ratios of the materials are easily adjustable, a high-resolution spectrometer may be easily manufactured compared to a case in which the size of QDs is adjusted based on synthesis.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A light filter comprising:
a plurality of spectrum modulation portions,
wherein each of the plurality of spectrum modulation portions has a transmittance spectrum different from a transmittance spectrum of each other of the plurality of spectrum modulation portions; and
at least one of a thickness and a material composition of each of the plurality of spectrum modulation portions is different from the at least one of the thickness and the material composition of each other of the plurality of spectrum modulation portions.

2. The light filter of claim 1, wherein:
the thickness of each of the plurality of spectrum modulation portions is different than the thickness of each other of the plurality of spectrum modulation portions; or
a ratio of a first material to a second material present in each of the plurality of spectrum modulation portions is different than a ratio of the first material to the second material present in each other of the plurality of spectrum modulation portions.

3. The light filter of claim 1, wherein the plurality of spectrum modulation portions are arranged in an array form.

4. The light filter of claim 1, wherein the transmittance spectrum of each of the plurality of spectrum modulation portions is non-linear with respect to the transmittance spectrum of each other of the plurality of spectrum modulation portions.

5. The light filter of claim 1, wherein the transmittance spectrum of each of the plurality of spectrum modulation portions is not parallel to the transmittance spectrum of each other of the plurality of spectrum modulation portions.

6. The light filter of claim 1, wherein the transmittance spectrum of each of the plurality of spectrum modulation portions does not intersect with the transmittance spectrum of each other of the plurality of spectrum modulation portions.

7. The light filter of claim 1, wherein each of the plurality of spectrum modulation portions comprises at least one of quantum dots (QDs), an inorganic material, and a polymer.

8. The light filter of claim 7, wherein each of the plurality of spectrum modulation portions comprises a plurality of QDs, wherein the QDs of all of the plurality of spectrum modulation portions are of a single type, have a same size, and comprise a same material.

9. The light filter of claim 8, wherein the thickness of each of the plurality of spectrum modulation portions is different from the thickness of each other of the plurality of spectrum modulation portions.

10. The light filter of claim 7, wherein a ratio of at least two of the QDs, the inorganic material, and the polymer in each of the plurality of spectrum modulation portions is different from the ratio in each other of the plurality of spectrum modulation portions.

11. The light filter of claim 1, wherein each of the plurality of spectrum modulation portions comprises quantum dots (QDs) of two or more types, having at least one of different sizes and different materials.

12. The light filter of claim 11, wherein the thickness of each of the plurality of spectrum modulation portions is different from the thickness of each other of the plurality of spectrum modulation portions.

13. The light filter of claim 11, wherein a ratio of at least two of the QDs, the inorganic material, and the polymer in each of the plurality of spectrum modulation portions is different from the ratio in each other of the plurality of spectrum modulation portions.

14. The light filter of claim 11, wherein a ratio of the QDs of the two or more types in each of the plurality of spectrum modulation portions is different from the ratio in each other of the plurality of spectrum modulation portions.

15. The light filter of claim 1, wherein the thickness of each of the plurality of spectrum modulation portions is within a range of 10 nm to 100 μm.

* * * * *